United States Patent
Van Casteren et al.

(10) Patent No.: US 9,580,620 B2
(45) Date of Patent: *Feb. 28, 2017

(54) COATING COMPOSITION COMPRISING AUTOXIDISABLE COMPONENT

(71) Applicant: DSM IP Assets B.V., Heerlen (NL)

(72) Inventors: Ilse Van Casteren, Waalwijk (NL); Gerardus Cornelis Overbeek, Waalwij (NL); Ronald Tennebroek, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 509 days.

This patent is subject to a terminal disclaimer.

(21) Appl. No.: 14/017,990

(22) Filed: Sep. 4, 2013

(65) Prior Publication Data

US 2014/0011041 A1 Jan. 9, 2014

Related U.S. Application Data

(63) Continuation of application No. 12/919,278, filed as application No. PCT/EP2009/053829 on Mar. 31, 2009, now abandoned.

(30) Foreign Application Priority Data

Mar. 31, 2008 (EP) ..................................... 08006274

(51) Int. Cl.
| | | |
|---|---|---|
| *C08F 220/28* | (2006.01) | |
| *C08F 220/32* | (2006.01) | |
| *C08F 8/14* | (2006.01) | |
| *C08F 212/08* | (2006.01) | |
| *C08F 8/44* | (2006.01) | |
| *C08F 120/06* | (2006.01) | |
| *C09D 139/06* | (2006.01) | |
| *C09D 137/00* | (2006.01) | |
| *C08J 5/18* | (2006.01) | |

(52) U.S. Cl.
CPC .............. *C09D 137/00* (2013.01); *C08F 8/14* (2013.01); *C08F 8/44* (2013.01); *C08F 120/06* (2013.01); *C08F 212/08* (2013.01); *C08F 220/28* (2013.01); *C08F 220/32* (2013.01); *C08J 5/18* (2013.01); *C09D 139/06* (2013.01); *C08F 2220/325* (2013.01); *C08F 2810/30* (2013.01); *C08F 2810/50* (2013.01); *Y10T 428/31938* (2015.04)

(58) Field of Classification Search
CPC ........ C08F 220/28; C08F 220/32; C08F 8/14; C08F 212/08; C08F 8/44; C08F 120/06; C08F 2220/325; C08F 2810/30; C08F 2810/50; C09D 139/06; C09D 137/00; C08J 5/18; Y10T 428/31938
USPC ......................................................... 524/543
See application file for complete search history.

(56) References Cited

U.S. PATENT DOCUMENTS

| | | |
|---|---|---|
| 5,089,342 A | 2/1992 | Dhein |
| 7,223,813 B2 | 5/2007 | Buckmann et al. |
| 2004/0039089 A1 | 2/2004 | Buckmann |
| 2014/0004351 A1* | 1/2014 | Van Casteren ...... C08G 18/283 428/413 |

OTHER PUBLICATIONS

Data Sheet for Nouracid LE80, Sep. 9, 2004.*
International Search Report for PCT/EP2009/053829, mailed Jun. 23, 2009.

* cited by examiner

*Primary Examiner* — Angela C Scott
(74) *Attorney, Agent, or Firm* — Nixon & Vanderhye P.C.

(57) ABSTRACT

An aqueous emulsion coating composition comprising an autoxidisable vinyl oligomer having ≥20 wt % of unsaturated fatty acid residue; Tg from −50 to +15° C.; Mw from 2,500 to 40,000 g/mol; polydispersity from 2 to 12, said composition having ≤15% co-solvent by weight of solids, ≤13% NMP by weight of solids ≥38% solids by weight of composition; said composition when in the form of a coating having a telegraphing value defined as the difference in gloss at a 20° angle of between a film cast on rough PVC and a film cast on smooth PVC of 10 gloss units.

8 Claims, No Drawings

COATING COMPOSITION COMPRISING AUTOXIDISABLE COMPONENT

This application is a continuation of commonly owned copending U.S. application Ser. No. 12/919,278, filed Dec. 20, 2010 (now abandoned), which is the national phase application under 35 USC §371 of PCT/EP2009/053829, filed Mar. 31, 2009, and claims the benefit of priority of EP 08006274.8, filed Mar. 31, 2008, the entire contents of which is hereby incorporated by reference.

The present invention relates to certain coating compositions that comprise an autoxidisable component and processes for making such compositions. Coatings of the invention show reduced telegraphing of surface irregularities after the composition has been applied to a surface.

There is a general need when applying a decorative or protective coating to a substrate to obtain a smooth surface without visible irregularities. The degree to which an underlying surface can be visually ascertained through a coating is often described as telegraphing (i.e. giving a clumsily obvious hint or premature indication of something to come). It has been found that irregularities on substrates (such as wood), which contribute to the roughness, are often telegraphed through conventional dry coatings.

Thicker coating materials are often used to reduce telegraphing because they are sufficiently able to level out any unevenness in the surface. Thus the underlying surface roughness of the substrate shows through to a reduced extent into the final coating which appears visually smooth. However, thicker coatings are disadvantageous because they may need to be applied in several layers, increasing the cost. Also slower through-drying, wrinkling and sagging can occur when using thicker layers.

Organic solvents have been used to reduce telegraphing. However with a continuing concern about the use of organic solvents there has been a long felt need for an aqueous coating composition with comparable properties to those achievable using compositions based on organic solvents.

A coating should also dry sufficiently quickly to avoid the adherence of dust and to ensure that the coating quickly becomes water resistant (e.g. in case of outdoor applications), blocking resistant and tack-free.

Aqueous compositions such as water dilutable autoxidisable esters (also known as water dilutable unsaturated alkyds or alkyd emulsions) have also been used to address the issue of telegraphing. However these systems have many well known problems.

Water dilutable alkyds may also suffer from backbone hydrolysis. This may lead to changes in the performance over time which is undesirable. Traditional alkyd emulsions are discussed in "Water borne and solvent based alkyds and their end user applications" by N. Tuck, volume VI, Wiley/Sita Series In Surface Coatings technology; (ISBN 471985910) published in 2000.

Another common problem of traditional alkyd emulsions is their tendency to produce cissing (also known as crawling) when applied as an over-coat. Cissing is when a coating refuses to form a continuous film, recedes from the surface, collects in beads and leaves the surface partially exposed thus reducing the appearance of the painted object.

Yet another disadvantage of traditional alkyd systems, especially those containing a relatively high percentage of unsaturated fatty acid residues, is their pronounced tendency to yellow (in light or dark) over time.

Current coatings lack some or all of the above mentioned performance characteristics, so coatings which exhibit reduced telegraphing with a combination of: minimal hydrolysis of the backbone of the alkyd, low yellowing over time and/or reduced cissing are desired.

Prior aqueous coatings have not been widely accepted in many markets as alternatives to solvent based coatings. For example solvent based alkyds are still preferred in the decorative market, where very low telegraphing is required as these coatings are often applied by brush. It is also desired that aqueous compositions are not milky or opaque but clear or transparent.

It is also generally known that polyester based alkyds (PE alkyds) typically have a broad molecular weight distribution and thus comprise a significant amount of material having a low molecular weight, which dries more slowly and therefore means the coating remains tacky for a longer period (i.e. has long tack free times). The presence of material of lower molecular weight cannot be avoided for many reasons. For example both glycerol (with three fatty acids—triglycerides) and pentaerythritol (with four fatty acids) are common raw materials used to prepare PE alkyds. To address the issues raised by the presence of the low molecular weight fraction, PE alkyds may be prepared in a highly branched form to obtain a high molecular weight fraction that dries more quickly. However the resultant branched PE alkyds have a significantly increased viscosity and reduced flow (compared to less branched equivalents) and thus must be diluted with more organic solvent before they can be used. This is undesirable as for example it increases the amount of volatile organic compounds (VOC) and adversely affects the flow of the composition.

It is known that autoxidisable vinyl polymers may be prepared by a radical polymerisation of vinyl monomers in the presence of a fatty acid derivative. However the resultant polymers have a broad molecular weight distribution, and these polymers require higher amounts of solvent to make a coating, which generally also contains high levels of free monomer. Without wishing to be bound by theory it is believed that unsaturated fatty acids retard radical polymerisation and graft onto the vinyl polymer resulting in more material of higher molecular weight and a broader molecular weight distribution.

WO 2002-033012 (=EP 1328594) (Avecia) discloses an aqueous coating composition based on a cross-linkable water-dispersible vinyl oligomer and optionally a dispersed polymer. The oligomers described in this application have a low amount of fatty acid (<40% by weight). As shown by the comparative data herein these oligomers are designed for a different purpose (improved open time) and produce coatings which, within a few days, lack satisfactory body (in the tests as defined herein), do not produce satisfactory tack free times. The acid functional acrylates described also contain high levels of NMP which will reduce the rate of curing and may contribute to yellowing.

U.S. Pat. No. 5,089,342, EP 0370299 and EP 0316732 (all Bayer) disclose an aqueous, air drying coating composition containing a water-soluble, air-drying polyacrylate with a molecular weight of more than 1000 g/mole and 5-40 wt % of chemically incorporated fatty acids and 50-100 milliequivalents per 100 grams of solid of chemically incorporated quaternary ammonium moieties. This reference describes systems that are cationic, teaching away from using anionic systems (e.g. see col. 1, line 53) and teaches use of styrenic monomers as part of the vinyl monomers which is not ideal as it can cause yellowing in the final product.

U.S. Pat. No. 5,096,959 (Valspar) discloses water based alkyd resins that are modified to provided increased hydrolytic stability by reacting them with a polybasic acid composition containing one or more cyclo-aliphatic polybasic acids.

WO 2007-147559 (DSM) describes air drying fatty acid functional hyper-branched resins. The resins are water soluble, due to a relatively high OH content and a low fatty acid level. This is less desirable due to the effect it has on water resistance and rate of cure and therefore on final properties.

US 2004-198903 discloses an ambient curable aqueous dispersion of polymer particles containing pendant ethylenically unsaturated side chains.

U.S. Pat. No. 6,653,381 discloses fatty acid functional vinyl polymers obtained by copolymerisation of fatty acid functional vinyl monomers. The low levels of fatty acid used may lead to insufficient flow during drying and slow cure rates.

EP 425085 discloses water based autoxidisable coating compositions comprising a partially esterified carboxylic acid functional film forming copolymer derived from olefinically unsaturated monomers. This reference teaches that it is essential for all or most of the autoxidisable groups to be 3-allyloxy-2-hydroxypropyl groups (or the 3-alkylallyl or butyl analogues) for the copolymer to retain a high degree of water solubility. This may result in a low cure rate and the allyl groups have been reported to release toxic compounds during cure.

JP 60110765 discloses the reaction of copolymer of an alpha beta unsaturated acid, such as acrylic acid and other monomers with a glycidyl ester of unsaturated fatty acid to form a resin which is combined with a second resin to give a thick aqueous coating.

We have now found ways to overcome the above mentioned disadvantages, especially when combinations of more then one of the problems need to be overcome in one coating system.

It is an object of the invention to solve some or all or the problems identified herein. A preferred object of the invention provides a method of improving the appearance of coated substrates, the substrates containing visual irregularities. In a more preferred object of the invention the method can be used with a wide variety of coating compositions.

The applicant has found that certain vinyl polymers prepared by radical polymerisation of certain vinyl/acrylic monomers may comprise significantly less low molecular weight fraction (like the aforementioned triglycerides) avoiding the need to use significant amounts of high molecular weight material, for example to improve drying. The applicant has also surprisingly found that certain vinyl polymers (with specific molecular weight, PDi and $T_g$ values), that are prepared by radical polymerisation of epoxy functional vinyl monomers with other vinyl monomers, and then reacted with certain unsaturated fatty acids may overcome some or all of the above identified problems with prior art vinyl polymers.

According to the present invention there is provided an aqueous emulsion, coating composition that comprises an autoxidisable vinyl oligomer where:
I) said autoxidisable vinyl oligomer has:
   i) fatty acid residue in an amount greater than or equal to 20% by weight of the autoxidisable vinyl oligomer;
   ii) a glass transition temperature ($T_g$) from −50° C. to +15° C.;
   iii) an acid value less than 40 mg KOH/g;
   iv) a weight average molecular weight ($M_w$) from 2,500 to 40,000 g/mol;
   v) a polydispersity (PDi) from 2 to 12;

II) said composition has:
   a) a co-solvent content less than 25% by weight of solids;
   b) a N-methylpyrrolidone content less than 13% by weight of solids;
   c) a solids content greater than or equal to 38% by the total weight of said composition; and
III) said composition when in the form of the film has a telegraphing value of less than 10 gloss units,
   where the telegraphing value is the difference between an initial smooth gloss value minus an initial rough gloss value of the film, where
   the initial smooth gloss value is the gloss when the film is cast on smooth PVC ($R_z$=1 µm [±0.25 µm]);
   the initial rough gloss value is the gloss when the film is cast on rough PVC($R_z$=25 microns [µm] [±5 µm]); and where
   each film has a dry film thickness of 52 µm [±6 µm]; and
   each initial gloss value is measured at a 20° angle, one day (24 hours) after the film has been cast.

As used herein PVC means a polyvinylchloride substrate used as described in the test methods herein.

Dry film thickness is measured herein after 24 hours of drying, under standard conditions. As used herein, unless the context indicates otherwise, the terms 'standard conditions' denotes a relative humidity of 50%±5%, ambient temperature and an air flow less than or equal to 0.1 m/s; and 'ambient temperature' denotes 23° C.±2°.

The telegraphing values herein will be positive numbers. In general the greater the reduction in telegraphing, the smaller will be the telegraphing value.

The term "comprising" as used herein means that the list that immediately follows is non exhaustive and may or may not include any other additional suitable items, for example one or more further feature(s), component(s), ingredient(s) and/or substituent(s) as appropriate. "Substantially comprising" as used herein means a component or list of component(s) is present in a given material in an amount greater than or equal to about 90%, preferably ≥95%, more preferably ≥98% by weight of the total amount of the given material. The term "consisting of" as used herein mean that the list that follows is exhaustive and does not include additional items.

For all upper and lower boundaries of any parameters given herein, the boundary value is included in each range for each parameter. All combinations of minimum and maximum values of the parameters described herein may be used to define the parameter ranges for various embodiments and preferences of the invention.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

As used herein the terms oligomer and polymer both refer to macromolecules which comprises a plurality of units derived, actually or conceptually, from molecules of lower molecular mass. These terms may also be used adjectivally to describe a part or the whole of a macromolecule. Often the term oligomer may be used more specifically to refer to macromolecules of intermediate relative molecular mass, where the oligomer properties vary significantly with the removal of one or a few units. Polymer may be used both generally to refer to any macromolecule and also more specifically to refer to macromolecules of high relative molecular mass where usually addition or removal of one or a few units has a negligible effect on the molecular properties (although this may not be always be the case for example where polymers have certain properties that are critically dependent on fine details of the molecular structure). It will be understood that the molecular mass boundary between an oligomer and a polymer (in its specific rather than general meaning) may vary according to the specific macromolecule and/or applications of interest and so they may be significant overlap where the same macromolecules may be considered both a oligomer and a polymer. Therefore, unless the context herein clearly indicates otherwise, the terms oligomer and polymer are used herein interchangeably.

Preferably each of the coating compositions of the invention are non-adhesive compositions. As used herein the term 'non-adhesive composition' denotes any composition that does not remain substantially tacky after drying under ambient conditions for a length of time which would be commercially acceptable. Non-adhesive compositions may be those which have a tack-free time of less than or equal to 16 hours, preferably ≤10 hours, more preferably ≤6 hours, most preferably ≤4 hours. Tack free time may conveniently be measured as described herein.

Preferred compositions of the invention produce coatings that have a telegraphing value (as defined herein) of less than 7 gloss units, more preferably less than 4 gloss units and most preferably less than 2 gloss units.

Preferably the initial rough gloss should not deteriorate significantly over time. This can be measured as a 'gloss decay' defined as the initial rough gloss minus a rough gloss measured at a later specified time. For example "gloss decay ('n' days)" is calculated as the initial rough gloss (measured 1 day after film formation) minus the rough gloss measured 'n' days after film formation (i.e. in this case n is always >1). Preferably the gloss decay is measured 4 days, more preferably 7 days and most preferably 14 days after film formation. Preferred values of gloss decay (for example after each of the periods given above) are less than 14 gloss units, more preferably less than 10 gloss units, most preferably less than 7 gloss units and especially less than 4 gloss units.

Without wishing to be bound by any theory it is believed that the vinyl polymers of the invention have a comb like structure allowing excellent control of molecular weight distribution to give a relatively narrow distribution resulting in good flow, reduced telegraphing and fast drying. Conventional vinyl polymers are typically highly branched and used under conditions which are close to those which cause the polymer to gel. In contrast the vinyl polymers of the invention are hydrolytically stable as their backbone is more resistant to hydrolysis. These properties are especially important for decorative paints which may stay on the shelf for a long time.

Polymers of the invention have a narrow molecular weight distribution (PDi) and a relatively low weight average molecular weight ($M_w$) and therefore an improved balance between $M_w$ and PDi. As such polymers have less material of low molecular weight, coating compositions of the invention (comprising such polymers) can dry fast, for example have short dust and/or tack free times. Aqueous compositions of the invention have other advantages. They may be prepared with lower viscosity due to the reduced amount of high molecular weight material and lower viscosity can reduce telegraphing. Compositions of the invention can also be prepared with a high solids content.

Preferably the autoxidisable vinyl polymer will cross-link at ambient temperature. Cross-linking by autoxidation means the cross-linking results from an oxidation occurring in the presence of air, usually involving a free radical mechanism and is preferably metal-catalysed resulting in covalent bonds. Suitable autoxidation is provided by for example fatty acid residues comprising unsaturated bonds, allyl functional residues and/or β(beta)-keto ester groups, preferably by fatty acid residues comprising unsaturated bonds.

As used herein 'fatty acid residue' (or FA residue), means fatty acids, simple derivatives thereof (such as esters (e.g. $C_{1-4}$alkyl esters), salts, soaps, oils, fats and/or waxes) and mixtures thereof. As used herein 'fatty acid' means any predominately unbranched, non-cyclic (preferably substantially linear) aliphatic carboxylic acid that substantially comprises, preferably consists of an aliphatic hydrocarbon chain and at least one carboxy group, preferably a single terminal carboxyl group (i.e. located at the end of the chain). Fatty acids may comprise a limited number of other substituents such as hydroxyl and may be saturated, mono-unsaturated or poly-unsaturated.

The fatty acid residue may be obtained from one or more natural and/or artificial source. Natural sources include animal sources and/or plant sources. Animal sources may comprise animal fat, butter fat, fish oil, lard, liver fats, sperm whale oil and/or tallow oil and waxes. Examples of waxes are beeswax, candelia and/or montan. Plant sources may comprise waxes and/or oils such as vegetable oils and/or non-vegetable oils. Examples of plant oils are: bitter gourd, borage, calendula, canola, castor, china wood, coconut, conifer seed, corn, cottonseed, dehydrated castor, flaxseed, grape seed, *Jacaranda mimosifolia* seed, linseed, olive, palm, palm kernel, peanut, pomegranate seed, rapeseed, safflower, snake gourd, soya(bean), sunflower, tung, and/or wheat germ. Artificial sources include synthetic waxes (such as micro crystalline and/or paraffin wax), distilling tall oil (a by-product of processing pine wood) and/or synthesis (for example by chemical and/or biochemical methods). Fatty acid residues having conjugated double bonds may be obtained by catalytic isomerisation of natural fatty acids and/or dehydrated castor oil. Conjugated oils are preferably obtained by dehydration of castor oil. Fatty acid residues may be obtained and/or obtainable from a plurality of the above sources and/or other sources not listed herein.

Preferred fatty acid residues may comprise fatty acid(s) having from 4 to 36, more preferably from 8 to 26, most preferably from 10 to 24, especially 12 to 22 carbon atoms. Generally fatty acids obtained from natural sources have an even number of carbon atoms due to their method of bio-synthesis, however fatty acids with an odd number of carbon atoms may also be useful in the present invention. Fatty acid residues may comprise fatty acids with one or more carboxylic acid groups, for example dimer or trimer fatty acids. Preferred fatty acids are mono functional, more preferably $C_{10-24}$mono functional carboxylic acids, most preferably $C_{12-22}$ linear mono functional terminal carboxy acids.

As long as oxidative drying of the polymer is not impaired the fatty acid residue may comprise one or more saturated fatty acids and/or oils, however at least some unsaturated fatty acid(s) is needed for auto-oxidation to occur. In general the more unsaturation present the more rapid the autoxidative drying.

An iodine number may be used to indicate the amount of unsaturation contained in fatty acids where a higher the iodine number indicates more unsaturated double bonds are present. Preferably the fatty acid residue used herein has an average iodine value greater than or equal to 50, more preferably ≥80 and most preferably ≥100 g I$_2$/100 g fatty acid. Preferably the fatty acid residue used herein has an average iodine value less than or equal to 200, more preferably ≤180 and most preferably ≤150 g I$_2$/100 g fatty acid. The iodine value may be measured conventionally or preferably as described in the test methods herein.

For the purpose of determining the amount of fatty acid residue used to obtain the vinyl polymer of the invention, it is convenient to calculate the weight of the fatty acid reactant by including the carbonyl group, but excluding the hydroxyl group of the terminal acid group of the fatty acid molecule.

Preferably the minimum amount of fatty acid residues in the autoxidisable vinyl polymer is greater than or equal to 30%, more preferably ≥38%, most preferably ≥43% and especially ≥50% by weight of the polymer.

Preferably the maximum amount of fatty acid residue in the autoxidisable vinyl polymer is less than or equal to 70%, more preferably ≤65%, most preferably ≤59% by weight of the polymer.

Preferably the fatty acid residue comprises $C_{10-30}$ fatty acids, more preferably $C_{16-20}$ fatty acids, in an amount greater than or equal to 80% by weight of the fatty acid residue. More preferably the fatty acid residue substantially comprises, most preferably consists of $C_{10-30}$ fatty acids, especially $C_{16-20}$ fatty acids.

If the fatty acid residue comprises saturated fatty acids they may be present in an amount less than or equal to 40%, more preferably 20% and most preferably from 3% to 18% by weight of the fatty acid residue.

Preferred vinyl polymers are those in which the autoxidisable groups are mainly derived from fatty acid residue. More preferably the fatty acid residue mainly comprises, most preferably substantially comprises unsaturated fatty acids. Useful unsaturated fatty acids have two or more double bonds and more usefully are conjugated fatty acids. Preferably at least 40% by weight, more preferably at least 60% by weight of the unsaturated fatty acids in the fatty acid residue are fatty acids that contain at least two ethylenically unsaturated groups (i.e. are polyunsaturated).

Preferred fatty acid residues comprise at least one conjugated fatty acid. The total amount of conjugated fatty acid may be greater than 0%, preferably ≥10% by weight of the unsaturated fatty acid. The total amount of conjugated fatty acid may be less than or equal to 70%, preferably ≤55%, more preferably ≤40%, by weight of the unsaturated fatty acid. The autoxidisable vinyl polymer may be obtained from a mixture of conjugated and non-conjugated unsaturated fatty acids.

A known problem with many autoxidisable coating compositions is that the resultant coatings have a tendency to yellow, in particular where the autoxidisable groups are derived from polyunsaturated fatty acids (e.g. those described herein). This may be unacceptable depending on the desired color of the resultant coating.

Therefore in another embodiment of the invention to reduce yellowing, preferred autoxidisable vinyl polymers are those where the unsaturated fatty residue comprises low amounts of highly polyunsaturated fatty acids. For example vinyl polymers that are more resistant to yellowing may be obtained and/or obtainable from fatty acid residue that comprise by weight of total fatty acid less than or equal to 10%, more preferably ≤7%, most preferably ≤4% and especially ≤2% of fatty acids with three or more double bonds. Examples of fatty acids that include three or more double bonds are given herein.

Preferred compositions of the invention have an initial yellowness value of less than or equal to 10, more preferably ≤7 and most preferably ≤4, when measured using the test method described herein. Preferred compositions show only a small increase in yellowness (Δb value) after being held in darkness for 3 weeks at 52° C., more preferably Δb is less than or equal to 10, still more preferably is ≤7, most preferably ≤5 and especially ≤3.

In yet another embodiment of the invention (e.g. where yellowing is not a concern) preferred autoxidisable vinyl polymers are those where the unsaturated fatty residue comprises higher amounts of highly polyunsaturated fatty acids (such as fatty acids with three or more double bonds) as this can improve the speed of autoxidative drying.

Preferably the unsaturated fatty acid is covalently bound to the vinyl polymer in a one step process, either though the use of a fatty acid functional vinyl monomer or through a reaction of the fatty acid with the vinyl polymer.

It is preferred that glycidyl esters of unsaturated fatty acids are not used in the preparation of the autoxidisable vinyl polymer as the synthesis of these glycidyl esters requires toxic raw materials like for instance epichlorohydrine which will also give chlorine containing waste material which is undesirable. A glycidyl ester of an unsaturated fatty acid is an epoxy functional fatty acid material (usually with a number average molecular weight ($M_n$) below 400) where the acid group has been reacted to obtain a glycidyl end group.

Optionally the fatty acid residue may also comprise one or more alkynyl group(s) and/or one or more (non carboxy) hydroxyl group(s).

Non limiting examples of some common fatty acids that may be used in the present invention are listed below as their systematic (IUPAC) names with their trivial name(s) in square parentheses where known. It will be appreciated that in practice most fatty acid residues (especially those obtained from natural sources) will comprise a mixture of many of these acids as well as other acids not specifically listed herein.

Saturated fatty acids may be selected from:
butanoic [butyric] acid ($C_4H_8O_2$), pentanoic [valeric] acid ($C_5H_{10}O_2$), hexanoic [caproic] acid ($C_6H_{12}O_2$), heptanoic [enanthic] acid ($C_7H_{14}O_2$), octanoic [caprylic] acid ($C_8H_{16}O_2$), nonanoic [pelargonic] acid ($C_9H_{18}O_2$), decanoic [capric] acid ($C_{10}H_{20}O_2$), dodecanoic [lauric] acid ($C_{12}H_{24}O_2$), tetradecanoic [myristic] acid ($C_{14}H_{28}O_2$), hexadecanoic [palmitic] acid ($C_{16}H_{32}O_2$), heptadecanoic [margaric also daturic] acid ($C_{17}H_{34}O_2$), octadecanoic [stearic] acid ($C_{18}H_{36}O_2$), eicosanoic [arachidic] acid ($C_{20}H_{40}O_2$), docosanoic [behenic] acid ($C_{22}H_{44}O_2$), tetracosanoic [lignoceric] acid ($C_{24}H_{48}O_2$), hexacosanoic [cerotic] acid ($C_{26}H_{52}O_2$), heptacosanoic [carboceric] acid ($C_{27}H_{54}O_2$), octacosanoic [montanic] acid ($C_{28}H_{56}O_2$), triacontanoic [melissic] acid ($C_{30}H_{60}O_2$), dotriacontanoic [lacceroic] acid ($C_{32}H_{64}O_2$), tritriacontanoic [ceromelissic also psyllic] acid ($C_{33}H_{66}O_2$), tetratriacontanoic [geddic] acid ($C_{34}H_{68}O_2$) and/or pentatriacontanoic [ceroplastic] acid ($C_{35}H_{70}O_2$).

Mono-unsaturated fatty acids may be selected from: (Z)-decan-4-enoic [obtusilic] acid ($C_{10}H_{18}O_2$), (Z)-decan-9-enoic [caproleic] acid ($C_{10}H_{18}O_2$), (Z)-undecan-10-enoic [undecylenic also 10-hendecenoic] acid ($C_{11}H_{20}O_2$), (Z)-dodan-4-ecenoic [linderic] acid ($C_{12}H_{22}O_2$), (Z)-dodecan-5-enoic (lauroleic) acid ($C_{12}H_{22}O_2$), (Z)-tetradecan-4-enoic [tsuzuic] acid ($C_{14}H_{26}O_2$), (Z)-tetradecan-5-enoic [physeteric] acid ($C_{14}H_{26}O_2$), (Z)-tetradecan-9-enoic [myristoleic] acid ($C_{14}H_{26}O_2$), (Z)-hexadan-6-enoic [sapienic] acid ($C_{16}H_{30}O_2$), (Z)-hexadan-9-enoic [palmitoleic] acid ($C_{16}H_{30}O_2$), (Z)-octadecan-6-enoic [petroselinic] acid ($C_{18}H_{34}O_2$), (E)-octadecan-9-enoic [elaidic] acid ($C_{18}H_{34}O_2$), (Z)-octadecan-9-enoic [oleic] acid ($C_{18}H_{34}O_2$), (Z)-octadecan-11-enoic [vaccenic also asclepic] acid ($C_{18}H_{34}O_2$), (Z)-eicosan-9-enoic [gadoleic] acid ($C_{20}H_{38}O_2$), (Z)-eicosan-11-enoic [gondoic] acid ($C_{20}H_{38}O_2$), (Z)-docosan-11-enoic [cetoleic] acid ($C_{22}H_{42}O_2$), (Z)-docosan-13-enoic [erucic] acid ($C_{22}H_{42}O_2$) and/or (Z)-tetracosan-15-enoic [nervonic] acid ($C_{24}H_{46}O_2$).

Di-unsaturated fatty acids may be selected from: (5Z,9Z)-hexadeca-5,9-dienoic acid ($C_{16}H_{28}O_2$), (5Z,9Z)-octadeca-5,9-dienoic [taxoleic] acid ($C_{18}H_{32}O_2$), (9Z,12Z)-octadeca-9,12-dienoic [linoleic] acid ($C_{18}H_{32}O_2$), (9Z,15Z)-octadeca-9,15-dienoic acid ($C_{18}H_{32}O_2$) and/or (7Z,11Z)-eicosa-7,11-dienoic [dihomotaxoleic] acid ($C_{20}H_{36}O_2$).

Tri-unsaturated fatty acids may be selected from: (5Z,9Z,12Z)-heptadeca-5,9,12-trienoic acid ($C_{17}H_{28}O_2$), (3Z,9Z,12Z)-octadeca-3,9,12-trienoic acid ($C_{18}H_{30}O_2$), (5Z,9Z,12Z)-octadeca-5,9,12-trienoic [pinolenic] acid ($C_{18}H_{30}O_2$), (6Z,9Z,12Z)-octadeca-6,9,12-trienoic acid [γ(gamma)-linolenic acid also GLA]($C_{18}H_{30}O_2$), (8E,10E,12Z)-octadeca-8,10,12-trienoic [calendic] acid ($C_{18}H_{30}O_2$), (8Z,10E,12Z)-octadeca-8,10,12-trienoic [jacaric] acid ($C_{18}H_{30}O_2$), (9E,11E,13E)-octadeca-9,11,13-trienoic [β(beta)-eleostearic also 3-oleostearic] acid ($C_{18}H_{30}O_2$), (9E,11E,13Z)-octadeca-9,11,13-trienoic [catalpic] acid ($C_{18}H_{30}O_2$), (9Z,11E,13E)-octadeca-9,11,13-trienoic [α(alpha)-eleostearic also α-oleostearic] acid ($C_{18}H_{30}O_2$) (where α-eleostearic acid comprises >65% of the fatty acids of tung oil), (9Z,11E,13Z)-octadeca-9,11,13-trienoic [punicic also trichosanic] acid ($C_{18}H_{30}O_2$), (9Z,11E,15Z)-octadeca-9,11,13-trienoic [rumelenic] acid ($C_{18}H_{30}O_2$), (9Z,13E,15Z)-octadeca-9,13,13-trienoic acid ($C_{18}H_{30}O_2$), (9Z,12Z,15Z)-octadeca-9,12,15-trienoic acid [α(alpha)-linolenic acid also ALA]($C_{18}H_{30}O_2$), (5Z,8Z,11Z)-eicosa-5,8,11-trienoic [dihomo-γ(gamma)-linolenic] acid ($C_{20}H_{34}O_2$), (5Z,11Z,14Z)-eicosa-8,11,14-trienoic [sciadonic] acid ($C_{20}H_{34}O_2$) and/or (8Z,11Z,14Z)-eicosa-8,11,14-trienoic [Mead] acid ($C_{20}H_{34}O_2$).

Tetra-unsaturated fatty acids may be selected from: (6Z,8Z,10Z,12Z)-hexadeca-6,8,10,15-tetraenoic acid ($C_{16}H_{24}O_2$), (6Z,8Z,10Z,12Z)-octadeca-6,8,10,12-tetraenoic acid ($C_{18}H_{28}O_2$), (6Z,9Z,12Z,15Z)-octadeca-6,9,12,15-tetraenoic [stearidonic] acid ($C_{18}H_{28}O_2$), (9Z,11E,13E,15Z)-octadeca-9,11,13,15-tetraenoic [α(alpha)-parinaric] acid ($C_{18}H_{28}O_2$), (9Z,11Z,13Z,15Z)-octadeca-9,11,13,15-tetraenoic [β(beta)-parinaric] acid ($C_{18}H_{28}O_2$), (5Z,8Z,11Z,14Z)-eicosa-5,8,11,14-tetraenoic acid [arachidonic acid also AA]($C_{20}H_{32}O_2$), (6Z,8Z,10Z,12Z)-eicosa-6,8,10,12-tetraenoic acid ($C_{20}H_{32}O_2$), (8Z,11Z,14Z,11Z)-eicosa-8,11,14,17-tetraenoic acid ($C_{20}H_{32}O_2$), (6Z,8Z,10Z,12Z)-docosa-6,8,10,12-tetraenoic acid ($C_{22}H_{36}O_2$) and/or (7Z,10Z,13Z,16Z)-docosa-7,10,13,16-tetraenoic acid ($C_{22}H_{36}O_2$).

Penta-unsaturated fatty acids may be selected from: (x,6Z,8Z,10Z,12Z)-hexadeca-x,6,8,10,12-pentaenoic acid(s) ($C_{16}H_{22}O_2$) where x denotes a fifth double bond optionally in a position which does not conjugate with the other four conjugated ethylenic double bonds, (x',6Z,8Z,10Z,12Z)-eicosa-x',6,8,10,12-pentaenoic acid(s) ($C_{20}H_{30}O_2$) where x' denotes a fifth double bond optionally in a position which does not conjugate with the other four ethylenic double bonds, (5E,7E,9E,14Z,17Z)-eicosa-5,8,11,14,17-pentaenoic acid ($C_{20}H_{30}O_2$), (5Z,7E,9E,14Z,17Z)-eicosa-5,8,11,14,17-pentaenoic acid ($C_{20}H_{30}O_2$), (5Z,8Z,11Z,14Z,17Z)-eicosa-5,8,11,14,17-pentaenoic acid [EPA] ($C_{20}H_{30}O_2$), (7Z,10Z,13Z,16Z,19Z)-docosa-7,10,13,16,19-pentaenoic [clupanodonic] acid ($C_{22}H_{34}O_2$), (4Z,7Z,10Z,13Z,16Z)-docosa-4,7,10,13,16-pentaenoic [osbond] acid ($C_{22}H_{34}O_2$) and/or (7Z,10Z,13Z,16Z,19Z)-docosa-7,10,13,16,19-pentaenoic acid [DPA] ($C_{22}H_{34}O_2$).

Hexa-unsaturated fatty acids may be selected from: (x",y",6Z,8Z,10Z,12Z)-eicosa-x",y",6,8,10,12-hexaenoic acid(s) ($C_{20}H_{28}O_2$) where x" and y" denote fifth and sixth double bonds optionally in positions which do not conjugate with the other four conjugated ethylenic double bonds, (4Z,7Z,10Z,13Z,16Z,19Z)-docosa-4,7,10,13,16,19-hexaenoic acid [DHA] ($C_{22}H_{32}O_2$) and/or (6Z,9Z,12Z,15Z,18Z,21Z)-tetracosa-6,9,12,15,18,21-hexaenoic [nisinic] acid ($C_{24}H_{36}O_2$).

Hepta-unsaturated fatty acids may be selected from: (w''',x''',y''',6Z,8Z,10Z,12Z)-eicosa-w''',x''',y''',6,8,10,12-heptaenoic acid(s) ($C_{22}H_{30}O_2$) where w''', x''' and y''' denote fifth, sixth and seven double bonds optionally in positions which do not conjugate with the other four conjugated ethylenic double bonds, and/or (4Z,7Z,9Z,11Z,13Z,16Z,19Z)-docosa-4,7,9,11,13,16,19-heptaenoic [stellaheptaenoic] acid ($C_{22}H_{30}O_2$).

Alkynyl-functional fatty acids may be selected from: (9Z)-octadeca-9-en-12-ynoic [crepenynic] acid ($C_{18}H_{30}O_2$).

Hydroxy-functional fatty acids may be selected from: 12-hydroxy-(9Z)-octadeca-9-enoic [ricinoleic] acid ($C_{18}H_{34}O_3$).

The cross-linking of the vinyl polymer herein is by autoxidation. In a preferred embodiment, metal ion cross-linking is used in combination with the autoxidation mechanism, e.g. by use of coordinative driers as is well known by those skilled in the art. Optionally (although less preferred) autoxidation is used in combination with other cross-linking mechanisms as are known in the art. Other cross-linking mechanisms known in the art include the reaction of alkoxysilane functional groups, Schiff base cross-linking, epoxy groups reacting with amino, carboxylic acid or mercapto groups, the reaction of amine or mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylene diamine or multifunctional amine terminated polyalkylene oxides) with β(beta)-diketo (for example acetoacetoxy or acetoamide) groups to form enamines.

The drying process of a coating composition can be divided into stages for example the period of time necessary to achieve dust-free and/or tack-free, coatings using the tests described herein.

Preferably the dust free time is less than or equal to 4 hours, more preferably ≤2 hours and most preferably ≤1 hour.

Preferably the tack-free time is less than or equal to 10 hours, more preferably ≤6 hours, most preferably ≤4 hours and particularly preferred <3 hours.

A problem often encountered in waterborne autoxidisable vinyl polymers is they have poor hydrolytic stability. This is a particular problem when polymer bound carboxylic acid groups are introduced by reaction with anhydrides, especially when in neutralized form. This problem can be reduced significantly by reducing the degree of water solubility of the autoxidisable resin. However in practice a balance between hydrolytic stability and water solubility is required.

The autoxidisable vinyl polymer may contain bound hydrophilic water-dispersing groups. Suitable hydrophilic groups are well known in the art, and can be ionic water-dispersing groups or non-ionic water-dispersing groups. Preferred non-ionic water-dispersing groups are polyalkylene oxide groups, more preferably polyethylene oxide groups. A small segment of the polyethylene oxide group can be replaced by a propylene oxide segment and/or butylene oxide segment, however the polyethylene oxide group should still contain ethylene oxide (EO) as a major component. When the water-dispersible group is polyethylene oxide, the preferred EO chain length is ≥4, more preferably ≥8 and most preferably ≥15 EO units. Preferably if the autoxidisable vinyl polymer contains polyalkylene oxide groups, the vinyl polymer has a polyalkylene oxide (optionally EO) content which is at least ≥0%, more preferably ≥2%, most preferably ≥3.5% and especially ≥5% and/or is no more than ≤50%, more preferably ≤30%, most preferably ≤15% and especially ≤9% by weight of the autoxidisable vinyl polymer. Preferably the polyalkylene oxide (optionally EO) group has a $M_w$ from 175 to 5000 g/mol, more preferably from 350 to 2200 g/mol, most preferably from 660 to 2200 g/mol.

Preferred ionic water-dispersing groups are anionic water-dispersing groups, especially carboxylic, phosphate, phosphonate or sulphonic acid groups. Most preferred are carboxylic, phosphate or phosphonate groups. The anionic water-dispersing groups are preferably fully or partially in the form of a salt. Conversion to the salt form is optionally effected by neutralisation of the autoxidisable vinyl polymer with a base, preferably during the preparation of the autoxidisable vinyl polymer and/or during the preparation of the composition of the present invention. The anionic dispersing groups may in some cases be provided by the use of a monomer having an already neutralised acid group in the autoxidisable vinyl polymer synthesis so that subsequent neutralisation is unnecessary. If anionic water-dispersing groups are used in combination with a non-ionic water-dispersing group, neutralisation may not be required.

If the anionic water-dispersing groups are neutralised, the base used to neutralise the groups is preferably, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. Generally a base is used which gives the required counter ion desired for the composition. For example, preferred counter ions include tertiary amines or $Li^+$, $Na^+$, $K^+$, $NH_4^+$ and substituted ammonium salts (for example a quaternary ammonium hydroxide $^+N(CH_3)_4$ $OH^-$).

Cationic water dispersible groups can also be used, but are less preferred. Examples include pyridine groups, imidazole groups and or quaternary ammonium groups which may be neutralised or permanently ionised. Due to the influence that neutralisation agents have on yellowing, tertiary amines and/or LiOH, NaOH and KOH are especially preferred.

The autoxidisable vinyl oligomer when in an aqueous coating composition preferably has an acid value (AV, also referred to as an acid number [AN]) from 0 to 28, more preferably from 0 to 18, most preferably from 0 to 12 mg KOH/g.

The autoxidisable vinyl oligomer, if carboxylic acid functional, preferably conforms to the following relationship (where ND denotes the degree to which the acid groups of the oligomer are neutralised):

$$ND \times AV \leq 22,$$

more preferably ≤12 and most preferably ≤8 mg KOH/g.

ND is a dimensionless fraction from 0 to 1 that indicates of the amount of neutralizing agent present in the polymer. For example if 80% of the acid groups on the polymer are neutralised, then the ND value is 0.8. AV is reported in units of mg KOH/g so the product ND×AV has units of mg KOH/g. When the polymer is not neutralised ND is 0 and so is ND×AV is also 0.

The autoxidisable vinyl polymer preferably has a hydroxyl number which is at least ≥25, more preferably ≥48 and/or is no more than ≤135, more preferably ≥110 mg KOH/g.

The aqueous coating composition of the invention preferably has a pH which is at least ≥2.0, more preferably ≥3.4 and most preferably ≥4.1 and especially ≥4.8 and/or is no more than ≤9.7, more preferably ≤8.4 and most preferably ≤7.6.

Preferably the weight average ($M_w$) of the autoxidisable vinyl oligomer is at least ≥4000, more preferably ≥5000, most preferably ≥8000 and/or is no more than ≤40000 more preferably ≤35000, most preferably ≤20000 and especially ≤15000 g/mol. $M_w$ is measured by GPC using polystyrene standards as described herein.

Preferably the majority of any cross-linking reaction only takes place after application of the aqueous coating composition to a substrate, to avoid an excessive molecular weight build up which may lead to an increased viscosity of the aqueous coating composition on the substrate in the early stages of drying.

The molecular weight distribution (MWD) of the vinyl oligomer has an influence on the viscosity of the oligomers in the composition and hence an influence on the telegraphing. MWD is conventionally described by a polydispersity index (PDi). PDi is defined as the weight average molecular weight ($M_w$) divided by the number average molecular weight ($M_w/M_n$) and is dimensionless. It has been found that a lower PDi often results in a lower viscosity and improved flow for an oligomer of given $M_w$. The autoxidisable vinyl oligomer may have a PDi which is no more than ≤8.3 preferably ≤7, more preferably ≤5 and more preferably ≤4.5 and/or is at least ≥2.5.

Preferably the weight average particle size of the autoxidisable vinyl oligomer dispersed in an aqueous coating composition is at least ≥50 nm, more preferably ≥80 nm, most preferably ≥120 nm and especially ≥150 nm. Preferably at least 80% of the particles have a weight average particle size ≤1000 nm, more preferably ≤750 nm, most preferably ≤550 nm and especially ≤400 nm.

Weight average particle size can be measured by any suitable method such as that described in the test methods herein.

The glass transition temperature ($T_g$) (as measured by DSC of a solid material) of the autoxidisable vinyl oligomer may vary within a wide range and preferably is at least ≥−50° C., more preferably ≥−40° C., more preferably ≥−25° C. and/or preferably is no more than ≤+15° C., more preferably ≤+10° C., most preferably ≤+5° C. and especially ≤0° C. Conveniently the $T_g$ of the autoxidisable vinyl oligomer may be from −45° C. to −10° C.

If the $T_g$ can not be measured by DSC because the first derivative of the DSC curve does not show any identifiable maximum, an alternative method for determining the $T_g$ is by calculating the $T_g$ using the following equation that relates viscosity of the pure vinyl oligomer to its $T_g$ (which is derived from the Williams-Landau-Ferry [WLF] equation):

$$\mathrm{Ln}(\eta)=27.6-[40.2\times(T-T_g)]/[51.6+(T-T_g)]$$

where:
$\mathrm{Ln}(\eta)$=Natural logarithm of the viscosity of the pure oligomer expressed in Pa·s (measured at ambient temperature using a shear rate from 0.005 and 1 s$^{-1}$)
$T=23°$ C.$\pm 1°$ C. (i.e. ambient temperature is used to measure the viscosity of the pure oligomer) and
$T_g$=glass temperature expressed in ° C.

Functional groups (such as fatty acid residue or water-dispersing groups) may be introduced into the autoxidisable vinyl oligomer using two general methods: i) by using monomers carrying the functional group in the polymerisation process to form autoxidisable oligomer carrying the functional group; or ii) using monomers bearing selected reactive groups where monomer is subsequently reacted with a compound carrying the functional group and also a reactive group of the type which will react with the selected reactive groups on the monomer to provide attachment of the functional group to the autoxidisable vinyl oligomer via covalent bonding. Thus the autoxidisable vinyl oligomer may be obtained by polymerising autoxidisable vinyl monomers with other vinyl monomers, or, the autoxidisable groups may be attached to the vinyl oligomer after radical polymerisation of vinyl monomers to make a vinyl oligomer. Preferably the autoxidisable groups are reacted with a vinyl oligomer. More preferably the vinyl oligomer comprises epoxy functional groups, most preferably glycidyl(meth)acrylate monomers such as GMA.

The autoxidisable vinyl oligomer may be prepared from free radically polymerisable ethylenically unsaturated monomer(s), and can contain polymerised units of a wide range of such monomers, especially those commonly used to make binders for the coatings industry. By a vinyl oligomer herein is meant a homo- or co-polymer derived from addition polymerisation, using a free radical initiated process which may be carried out in an aqueous or non-aqueous medium, of one or more ethylenically unsaturated monomers. Therefore by a vinyl monomer is meant an ethylenically unsaturated monomer.

Examples of vinyl monomers which may be used to form a vinyl oligomer include but are not limited to: 1,3-butadiene, isoprene, styrene, α-methyl styrene, divinyl benzene, acrylonitrile, methacrylonitrile, vinyl ethers, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of Formula I

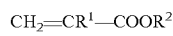    Formula I where $R^1$ is H or methyl and $R^2$ is optionally substituted $C_{1-20}$ alkyl (preferably $C_{1-8}$alkyl) or optionally substituted $C_{3-20}$ cycloalkyl (preferably $C_{3-8}$ cycloalkyl), examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl(meth)acrylates such as hydroxyethyl acrylate, hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Ethylenically unsaturated monocarboxylic, sulphonic and/or dicarboxylic acids, such as acrylic acid, methacrylic acid, β-carboxy ethyl acrylate, fumaric acid and/or itaconic acid may be used. Ethylenically unsaturated monomers such as (meth)acrylamide and/or methoxypolyethyleneoxide (meth)acrylate may also be used.

The vinyl monomer may optionally contain functional groups to contribute to the cross-linking of the vinyl polymer(s) in the coating. Examples of such groups include: maleic, epoxy, fumaric, acetoacetoxy, β(beta)-diketone, acryloyl, methacryloyl, styrenic, (meth)allyl groups, mercapto groups, keto or aldehyde groups (such as methyl vinyl ketone [MEK], diacetone acrylamide and (meth)acrolein).

Preferred vinyl polymers have a backbone made from a monomer system comprising at least 40% of one or more monomers of Formula I by weight of the polymer. Such a preferred backbone for the vinyl polymer is defined herein as an (meth)acrylic polymer. A particularly preferred autoxidisable vinyl polymer is an autoxidisable acrylic polymer (i.e. based predominantly on at least one ester of acrylic and/or methacrylic acid). More preferably, the monomer system for the vinyl backbone comprises at least 50%, most preferably at least 60% of such monomers by weight of polymer. The other monomer(s) in such acrylic autoxidisable vinyl polymers (where used) may include one or more of the other vinyl monomers mentioned above, and/or may include monomer(s) different to such other monomers.

Particularly preferred monomers include butyl acrylate (all isomers), butyl methacrylate (all isomers), methyl methacrylate, ethyl hexyl methacrylate, esters of (meth)acrylic acid, acrylonitrile, vinyl acetate and styrene.

Preferably the vinyl polymer contains less than 40% styrene, more preferably less then 20%, most preferably less than 12% and especially less than 5% by weight of polymer.

Preferably the vinyl polymer prepared in step I (before fatty acid functionalisation) is substantially free of chlorine containing monomers. Substantially free means such monomers are in an amount ≤1%, more preferably ≤0.5% and especially 0% by weight of the vinyl polymer prepared in step I.

Alternatively vinyl functional monomers with an autoxidisable moiety can be used, like the reaction product of GMA and fatty acid or the monomer SerAD FX522 available commercially from Servo Condea under that trade name.

In a preferred embodiment first a vinyl oligomer is prepared, which is subsequently reacted to obtain an autoxidisable vinyl oligomer of the invention.

Monomers "G" which are useful for reacting the fatty acid onto the vinyl oligomer to give fatty acid residues include hydroxylalkyl(meth)acrylates, such as hydroxyethyl(meth)acrylate, hydroxypropyl(meth)acrylate and ToneM-100 and epoxy functional vinyl monomers like glycidyl(meth)acrylate (GMA) or 3,4-epoxy-cyclohexyl methyl-acrylate.

In a preferred embodiment 30% to 70% of monomer G (by weight of the total monomers) is used, before functionalisation, to obtain an autoxidisable vinyl oligomer of the invention. Preferably the vinyl oligomer comprising monomer G is then reacted with fatty acid, where typically between 0.4 and 1.0 equivalent of fatty acid is reacted with the graftable groups present on the vinyl oligomer. For this purpose, it is considered that a hydroxyl graftable group can react once with a fatty acid, whereas a epoxy graftable group can react twice, due to the additionally formed hydroxyl group on ring opening. A particularly preferred monomer G is GMA.

The autoxidisable vinyl oligomer is preferably prepared by free radical polymerisation, although in some circumstances anionic polymerisation may be utilised. The free radical polymerisation can be performed by techniques known in the art, for example as emulsion polymerisation, solution polymerisation, suspension polymerisation or bulk polymerisation.

The autoxidisable vinyl oligomer is preferably prepared in one or more solvents before being dispersed in water.

The autoxidisable vinyl oligomer is preferably made in a non-continuous process to allow for improved control during polymerisation.

Preferably less then 10% and more preferred less then 5% of the autoxidisable vinyl oligomer solids (by weight of solids) should consist of oligomeric vinyl material which is covalently bound to a fatty acid, whereby the covalent bond is generated through a grafting reaction of a propagating vinyl radical onto the unsaturated fatty acid.

In the latter case the fatty acid can either be a free unsaturated fatty acid or an unsaturated fatty which is part of a polymeric structure.

Most preferably there is no grafting of vinyl monomers to the fatty acid at all.

A free-radical polymerisation of vinyl monomer(s) to form a crosslinkable vinyl autoxidisable vinyl oligomer or precursor vinyl autoxidisable vinyl oligomer will require the use of a free-radical-yielding initiator(s) to initiate the vinyl polymerisation. Suitable free-radical-yielding initiators include inorganic peroxides such as K, Na or ammonium persulphate, hydrogen peroxide, alkyl hydroperoxides such as t-butyl hydroperoxide and cumene hydroperoxide; dialkyl peroxides such as di-t-butyl peroxide and the like; mixtures may also be used. The peroxy compounds are in some cases advantageously used in combination with suitable reducing agents (redox systems) such as Na or K pyrosulphite or bisulphite, and iso-ascorbic acid.

It may be desirable to control the molecular weight by addition of a chain transfer agent to the free radical polymerisation process. Conventional chain transfer agents may be utilised and include mercaptans, sulphides, disulphides and halocarbons. In particular however the technique known as catalytic chain transfer polymerisation (CCTP) may be used to provide low molecular weights. In this case a free radical polymerisation is carried out using a free radical forming initiator and a catalytic amount of a selected transition metal complex acting as a catalytic chain transfer agent (CCTA), and in particular a selected cobalt chelate complex. Such a technique has been described for example in N. S. Enikolopyan et al, J. Polym. Chem. Ed., Vol 19, 879 (1981), U.S. Pat. No. 4,526,945, U.S. Pat. No. 4,680,354, EP-A-0196783, EP-A-0199436, EP-A-0788518 and WO-A-87/03605.

The use of catalytic chain transfer agents provide four important benefits:
  a) very low concentrations of catalytic chain transfer agent (typically 1 to 1000 ppm by weight of vinyl monomer used) are required to attain the preferred low molecular weight oligomer and do not have the odour often associated with conventional chain transfer agents;
  b) a vinyl autoxidisable vinyl oligomer prepared by CCTP contains a terminal unsaturated group on many, if not every vinyl oligomer molecule. This terminal unsaturation can participate in autoxidation reactions for example in fatty acid crosslinking systems. Thus the crosslinkable vinyl autoxidisable vinyl oligomer of the present invention could have autoxidisable crosslinker groups comprising the unsaturated groups from fatty acids as well as terminal unsaturated groups resulting from CCTP.
  c) CCTP allows the preparation of a vinyl autoxidisable vinyl oligomer which has a narrower PDi than is achievable by the use of conventional chain transfer agents for low Mw autoxidisable oligomer.
  d) Especially when epoxy functional monomers are used, CCTP has the benefit compared to e.g. chain transfer agents with mercaptan groups, that the CCTA does not react with the epoxy groups.

The solids content of the aqueous coating composition of the invention is at least preferably ≥45% and more preferably ≥49% and/or is no more than preferably ≤72%, more preferably ≤65% and most preferably ≤63% by weight of the composition.

The autoxidisable vinyl oligomer may be dispersed in water using techniques well known in the art. The crosslinkable autoxidisable vinyl oligomer normally requires the use of an external surfactant when being dispersed into water. Surfactants and or high shear can be utilised in order to assist in the dispersion of the autoxidisable vinyl oligomer in water. Suitable surfactants include but are not limited to conventional anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The surfactants may also be polymeric surfactants which are also described as wetting agents.

The amount of total surfactants used in aqueous compositions of the invention is preferably at least ≥0.1%, more preferably ≥1%, most preferably ≥3% and/or is preferably no more than ≤11%, more preferably ≤9% and most preferably ≤7% by weight of the autoxidisable vinyl oligomer. Preferably a mixture of anionic and non-ionic surfactants are used.

If the aqueous composition comprising anionic surfactant, the anionic surfactant may comprise ethylene oxide (EO) groups in an amount which is preferably no more than ≤90%, more preferably ≤70%; most preferably ≤55% and/or is preferably at least ≥10% and/or ≥20% EO groups by weight of the surfactant. Preferred anionic surfactants comprise sulphate, sulphonate, phosphate and/or phosphonate groups.

The aqueous composition may comprise non-ionic surfactant in an amount of preferably at least ≥0.1%, more preferably ≥0.5%, still more preferably ≥1% and most preferably ≥1.5% and/or preferably no more than ≤12%, more preferably ≤9%, still more preferably ≤5% and most preferably ≤3.5% by weight of vinyl oligomer solids.

Optionally to reduce the effect of cissing the composition comprises ionic surfactant in an amount of at least preferably ≥0.1%, more preferably ≥0.5%, still more preferably ≥1% and most preferably ≥1.5% and/or no more than preferably ≤12%, more preferably ≤9%, most preferably ≤5% by weight of vinyl polymer solids.

Dispersants (such as dispersing compounds and/or dispersing resin) which preferably are autoxidisable (such as W-3000 available from Perstorp or as described in EP1870442) could also be employed instead of or combined with more conventional surfactants. Optionally where used the dispersant (such as a dispersing resin) is present in amount of at least preferably ≥0.1%, more preferably ≥3% and most preferably ≥5% and/or no more than preferably ≤30%, more preferably ≤20% and most preferably ≤12% by weight of solid resin.

The aqueous coating composition of the invention is particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition.

An organic solvent may optionally be added before, during and/or after the polymerisation process for making the autoxidisable vinyl oligomer to control the viscosity. Examples of solvents include water-miscible solvents such as propylene glycol based solvents, especially propylene glycol mono methyl ether and dipropylene glycol mono methyl ether and glycol ethers such as butyldiglycol. Optionally no organic solvents are added.

A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of the autoxidisable vinyl oligomer or may have been added during formulation of the aqueous composition.

The aqueous composition of the invention may have a co-solvent content in an amount of at least preferably ≥2%, more preferably ≥3.5%, and most preferably ≥5% and/or no more than preferably ≤18%, more preferably ≤15% and most preferably ≤9% by weight of oligomer solids. Most preferably substantially no co-solvent is used as this gives improved storage stability and a better ecological profile.

An advantage of the current invention is that co-solvent can, as is often required for environmental and safety reasons, be present at a very low concentrations because of the plasticising nature of the autoxidisable oligomer.

Preferably the use of a nitrogen containing solvent is less desired for reasons of toxicity profile, yellowing and odour.

In general, aromatic or heterocyclic nitrogen-containing ligands or aromatic and aliphatic primary and secondary (di)amines were found to prolong the drying time to a considerable extent (as reported in Coordination Chemistry Reviews 249 (2005) 1709-1728). An example includes heterocyclic nitrogen-containing solvents such as N-methylpyrrolidone (NMP) and N-ethylpyrrolidone.

Preferably the aqueous coating composition comprises NMP in an amount of no more than ≤13%, more preferably ≤10%, most preferably ≤5% and especially ≤0.5% by weight of oligomer solids.

Preferably the aqueous coating composition comprises only a small amount of nitrogen containing molecules with an evaporation rate ≤0.1, more preferably ≤0.05 (as calculated below), the molecules being aromatic, heterocyclic or aliphatic primary and secondary di-amines where the weight % of nitrogen is ≥5% and more preferably ≥10%.

Preferably such nitrogen containing molecules are present in the aqueous coating composition in an amount ≤13%, more preferably ≤8%, most preferably ≤5% and especially ≤0.5% by weight of oligomer solids.

Values for evaporation rates were published by Texaco Chemical Company in a bulletin Solvent Data; Solvent Properties (1990). These values are relative to the evaporation rate of n-butyl acetate for which the evaporation rate is defined as 1.00. Determination of evaporation rates of solvents not listed in this bulletin is as described in ASTM D3539. Co-solvents with low evaporation rates give undesired effects in the final coatings resulting in slow hardness development acting as a plasticizer.

It is preferred to have <16% by weight of oligomer solids of a co-solvent with an evaporation rate between 0.05 and 0.005.

Preferably when the aqueous composition is formulated as paint, the composition comprises 2% to 10%, more preferably 3% to 9% of solvent by weight of the total paint composition. Preferably at least 50%, more preferably ≥80%, most preferably ≥95% by weight of the total solvent are solvent(s) having an evaporation rate (as defined herein) higher than 0.012, more preferably from 0.018 to 0.25, most preferably lower than 0.21.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings on wood and board substrates. The aqueous carrier medium is removed by natural drying or accelerated drying (by applying heat) to form a coating. Accordingly in a further embodiment of the invention there is provided a coating obtainable from an aqueous coating composition of the present invention.

The aqueous coating composition of the invention may contain other conventional ingredients including pigments, dyes, emulsifiers, surfactants, plasticisers, thickeners, heat stabilisers, levelling agents, anti-cratering agents, fillers, sedimentation inhibitors, UV absorbers, antioxidants, dispersants, reactive diluents, waxes, neutralising agents, adhesion promoters, defoamers, co-solvents, wetting agents and the like introduced at any stage of the production process or subsequently. It is possible to include fire retardants like antimony oxide in the dispersions to enhance the fire retardant properties.

Preferred reactive diluents (which may or may not be the autoxidisable) may also have one or more of the following properties: $M_n$>1000 g/mol, more preferably >1500 g/mol and most preferably >2000 g/mol; $M_n$<5000 g/mol, more preferably <4000 g/mol and especially <3500 g/mol; and/or optionally (e.g. where the reactive diluent is autoxidisable) from 60 to 90 wt %, more preferably 75 to 90%, most preferably 80 to 90% of fatty acid residues with an iodine value from 50 to 175, more preferably from 80 to 150 g $I_2$/100 g by weight of sample.

In particular, the aqueous coating compositions of the invention and formulations containing them advantageously include at least a drier salt. Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salt(s) in the composition is typically that to provide an amount of metal within the range of from 0.01 to 0.5% by weight based on the weight of autoxidisable oligomer.

Drier salts are conventionally supplied as solutions in solvents for use in solvent-borne alkyd systems. They may, however, be used quite satisfactorily in aqueous coating compositions since they can normally be dispersed in such systems fairly easily. The drier salt(s) may be incorporated into the aqueous coating composition at any convenient stage. For example the drier salt(s) may be added prior to dispersion into water. Drier accelerators may be added to the drier salts. Suitable drier accelerators include 2,2'-bipyridyl and 1,10-phenanthroline.

In an embodiment of the present invention there is provided an aqueous autoxidisable coating composition with reduced telegraphing as defined herein comprising an autoxidisable vinyl oligomer obtained by a process comprising steps:
1) polymerising ethylenically unsaturated vinyl monomers comprising:
   i) 30% to 70% of at least one monomer G selected from hydroxylalkyl(meth)acrylates and epoxy functional vinyl monomers;
   ii) 30% to 70% of at least one other ethylenically unsaturated vinyl monomer; and
   iii) <1% of chlorine containing monomers;
   where the percentages are by weight of total monomers;
II) reacting the oligomer obtained in step I) with fatty acids having an average iodine value in the range of 80 to 180 g $I_2$/100 g fatty acid;
wherein the autoxidisable vinyl oligomer comprises by weight of oligomer: 35% to 62% of polymeric backbone; and 38% to 65% of fatty acid residue; and
where the autoxidisable vinyl oligomer has:
i) a $T_g$ from −50° C. to 15° C.;
ii) a $M_w$ from 6500 to 25000 g/mol; and
iii) a PDi from 2 to 8;
said composition having
a) a co-solvent content 15% by weight of solids;
b) a N-methylpyrrolidone content 3% by weight of solids;
c) heterocyclic amine containing solvent content of 0 wt % by weight of solids;
d) a solids content 38% by weight of the composition;
e) a pH from 4.1 to 8.4.
and
where said composition when in the form of a film has a telegraphing value (as defined herein) or less than 10 gloss units and optionally the film has a tack free time <6 hours.

In an another embodiment of the invention there is provided an aqueous emulsion coating composition with a telegraphing value (as defined herein) of less than 10 gloss units, said composition comprising:
i) 38% to 65% of the autoxidisable vinyl oligomer described herein;
ii) 0 to 20%, more preferably 0 to 15%, most preferably 0 to 10% and especially 0 to 5% of co-solvent; and
iii) 15% to 58% of water; where all percentages are by weight of the composition and i)+ii)+iii)=100%.

In another embodiment of the invention there is provided an aqueous emulsion coating composition with a telegraphing value (as defined herein) of less than 10 gloss units said composition comprising:
i) 20% to 45%, preferably 25 to 40%, of $TiO_2$;
ii) 20% to 45%, preferably 25 to 40%, of the autoxidisable vinyl oligomer as described herein;
iii) 0 to 10%, preferably 0 to 5%, of co-solvent;
iv) 0.1% to 3% of thickener;
v) 0 to 5% of dispersing agent; and
vi) 25% to 60% water;
where all percentages are by weight of the composition and i)+ii)+iii)+iv)+v)=100%.

If desired the aqueous dispersion of the invention can be used in combination with other polymer dispersions or solutions.

Preferably such other dispersions or solutions comprise less than or equal to 35%, more preferably ≤20%, most preferably ≤10% and especially preferably ≤4% by weight of the total autoxidisable vinyl oligomer.

Preferably the aqueous coating composition when coated onto a substrate is water resistant, in the tests as described herein, for 30 minutes, more preferably for 1 hour and most preferably for 3 hours.

Preferably the aqueous coating composition when coated onto a substrate is block resistant in the tests as described herein at ambient temperature with a rating of 3 or more preferably at 52° C. with a rating of 3 or more.

Preferably the aqueous coating composition is a one component system, meaning that preferably no additional crosslinking agents, like polyaziridines, polycarbodiimides or polyisocyanates or melamines are added to the aqueous coating composition, prior to applying the composition to a substrate.

Preferably the aqueous coating composition is free from photoinitiators and is cured without the use of radiation curing equipment.

A further aspect of the invention provides a coating obtained and/or obtainable by a coating composition of the invention and having a telegraphing value (as defined herein) of less than 10 gloss units.

Another aspect of the invention provides a substrate coated with a coating of the invention.

A still other aspect of the invention provides a method of coating a substrate comprising the steps of i) applying a coating composition of the invention to the substrate; ii) drying the substrate to form a coating thereon; where the coating has a telegraphing value (as defined herein) of less than 10 gloss units.

Yet another aspect of the invention provides use of an autoxidisable vinyl polymer and/or a coating composition of the invention for the purpose of obtaining coatings having a telegraphing value (as defined herein) of less than 10 gloss units.

A still yet other aspect of the invention provides a method of manufacture of an autoxidisable vinyl polymer and/or a coating composition of the invention for the purpose of obtaining coatings having a telegraphing value (as defined herein) of less than 10 gloss units.

Many other variations embodiments of the invention will be apparent to those skilled in the art and such variations are contemplated within the broad scope of the present invention. Further aspects of the invention and preferred features thereof are given in the claims herein.

The present invention is now illustrated by reference to the following non-limiting examples. Unless otherwise specified, all parts, percentages and ratios are on a weight basis. The prefix C before an example denotes that it is comparative. The term "working" means that the example is according to the invention. The term "non-working" means that it is not according to the invention (i.e. comparative).

Various registered trademarks, other designations and/or abbreviations are used herein to denote some of ingredients used to prepare polymers and compositions of the invention. These are identified below by chemical name and/or tradename and optionally their manufacturer or supplier from whom they are available commercially. However where a chemical name and/or supplier of a material described herein is not given it may easily be found for example in reference literature well known to those skilled in the art: such as: 'McCutcheon's Emulsifiers and Detergents', Rock Road, Glen Rock, N.J. 07452-1700, USA, 1997 and/or Hawley's Condensed Chemical Dictionary (14th Edition) by Lewis, Richard J., Sr.; John Wiley & Sons.

'AIBN' denotes azobisisobutyronitrile;
'Additol VXW4940' denotes the drying pigment commercially available from Elementis under this trade name;
'Atlas G5000' denotes the nonionic polyalkylene glycol ether available commercially from Uniqema under this trade designation;
'BA' denotes n-butyl acrylate
'3,5-BHT' denotes 3,5-di-tert-butyl-4-methylphenol (also known as butyl hydroxy toluene);
'BMA' denotes n-butylmethacrylate;
'CoF' denotes the catalyst Co II (bis 4,4'-dimethylbenzil dioxime)diborondifluoride, as described in EP1742973-A, US2007219328 and WO2005105855;
'Dehydran 1293; denotes a solution of a special modified polydimethyl siloxane defoamer that is commercially available from Cognis under this trade name;
'Disperbyk 190" denotes that a solution of a high molecular weight block copolymer with pigment affinic groups that is a dispersing additive for pigments that is commercially available from BYK Chemie under this trade name;
'Dow PnP' denotes that propylene glycol n-propyl ether mixture commercially available from Dow Chemicals under the trade name Dowanol PnP;
'dtAP' denotes di-tert-amylperoxide
'dtBP' denotes di-tert-butylperoxide
'FES77' denotes the dispersant which is a sodium salt of a fatty alcohol gycol ether sulphate and is available commercially from Cognis under the trade name Disponil FES 77;
'FES993' denotes the dispersant which is a sodium salt of a fatty alcohol gycol ether sulphate and is available commercially from Cognis under the trade name Disponil FES 993 IS;
'GMA' denotes glycidyl methacrylate;
'HHPA' denotes hexahydro phtalic anhydride;
'Kronos 2190' denotes a titanium dioxide pigment commercially available from Kronos under this trade name;
'MMA' denotes methyl methacrylate;
'MSA' denotes methane sulphonic acid
'FAA' denotes a conventional polyacrylic acid with weight average molecular weight (Mw) of from 200-250 KDalton which has been prepared by the applicant;
'PVC' denotes polyvinyl chloride
'Sefose' denotes a soyate made from partially hydrogenated soybean oil which is commercially available from P&G Chemicals under the trade name Sefose 1618SC,
'Sun-FA' denotes sunflower fatty acid;
'tBP' denotes tert-butyl peroxide 'tBPD' denotes t-butyl peroxybenzoate
'TEA' denotes triethyl amine;
'THF' denotes tetrahydrofuran; and
'TRAP' denotes triphenyl ethyl phosphonium bromide.
Test Methods:
Standard Conditions As used herein, unless the context indicates otherwise, standard conditions (e.g. for drying a film) means a relative humidity of 50%±5%, ambient temperature (23° C.±2°) and an air flow of 0.1 m/s.
Particle Size The particle sizes given herein are the size of a weight averaged particle and are quoted as a linear dimension which is a particle diameter as the particles can be considered to be essentially spherical. Weight average particle size may be measured using Scanning/Transmission Electron Microscope and Photon Correlation Spectroscopy.
Iodine Number The iodine value (also referred to herein as iodine number) is a measure of the amount of ethylenic unsaturated double bonds in a sample and increases with a greater degree of unsaturation. Iodine value may be defined according to DIN 53241-1 as the quotient of that mass $m_I$ of iodine which is added on to the olefinic double bonds, with decolourisation, of a sample to be analysed and the mass $m_B$ of this sample (mass of the solid in the sample in the case of solutions or dispersions). Iodine values may be quoted either in units of centigrams of iodine per gram of sample (cg $I_2$/g) or in units of grams of iodine per 100 gram of sample (g $I_2$/100 g). Standard methods for analysis may be used such as for example ASTM D5768-02 (2006) and DIN 53241. One common method (and that used to measure the iodine values given herein) is the Wjjs method in which iodine absorption is determined by titrating unreact reagent with sodium thiosulfate and the iodine value is then calculated as follows:

$$\text{Iodine value} = \frac{(12.69) \times (\text{ml of thiosulfate}) \times (\text{normality})}{\text{mass of sample (g)}}$$

Telegraphing

Two types of PVC substrates are used to determine the degree of telegraphing of an unpigmented coating comprising the autoxidisable resin:

The first PVC type is the 2 mm thick rough PVC substrate with a well defined and uniform rough surface that is available commercially from Vink Kunststoffen B.V (Didam, Holland) under the trade name Vikupor white PVC film type JD11. An area of 1.9×2.5 mm of the substrate surface is analysed with a Wyko optical profilometer NT1100 at a magnification of 2.5 to give $R_z$=25 µm±5 µm. $R_z$ denotes the 'ten-point height', which is the average of the five greatest peak-to-valley separations in the scanned area, and is regarded as a general value for surface roughness. The second PVC type is a 3 mm thick smooth PVC substrate with a well defined smooth surface that is also available commercially from Vink Kunststoffen under the trade name Vikunyl white PVC film glossy type 206221. $R_z$=1 µm±0.25 µm. (measured as for rough PVC).

The unpigmented coating comprising (optionally comprising flow and wetting agents and thickeners if needed) is cast on both PVC substrates (rough and smooth) and a smooth and defect free film is obtained, resulting in a theoretical dry film thickness between 52 µm±6 µm. The film is dried under standard conditions for 24 hours and the gloss is measured at a 20° angle. This gloss measurement is repeated after 4 days, 7 days and 14 days. The difference in gloss readings between the films on rough and smooth PVC is a quantitative measure of the extent to which the rough surface of the PVC is telegraphed to the surface of the dried coating. The smaller the difference in these gloss values, the smaller the degree of telegraphing and the better the coating hides the substrate roughness.

Also the absolute value for gloss reading on rough PVC should not decrease significantly in time so that the reduced telegraphing is maintained.

Drying Time:

To test the dust-free and tack-free drying times of the compositions prepared in the Examples as described below, the compositions are formulated and applied to a glass plate at a wet film thickness of 80 μm. Tests for drying times are performed at regular time intervals under standard conditions.

Dust-Free Time:

The dust-free time (DFT) is determined by dropping a piece of cotton wool (about 1 cm$^3$ i.e. 0.1 g) on to the drying film from a distance of 25 cm. If the piece of cotton wool can immediately be blown from the substrate by a person without leaving any wool or marks in or on the film, the film is considered to be dust-free.

Tack-Free Time:

The tack-free time (TFT) is determined by placing a piece of cotton wool (about 1 cm$^3$, 0.1 g) on the drying film and placing a weight of 1 kg onto the piece of cotton wool (for 10 seconds). If the piece of cotton wool can be removed from the substrate by hand without leaving any wool or marks in or on the film, the film is considered to be tack-free.

Blocking Test

A 100 μm thick wet film is cast on a Leneta chart and dried for 24 hours under standard conditions. Resistance to blocking is determined using a block tester, where pairs of the coated test charts are placed with the film coatings face to face and left at ambient temperature for 4 hours or left at 52° C. for 2 hours with a pressure of 250 g/cm$^2$. After cooling to ambient temperature (if applicable), the test charts are peeled apart and the degree of block resistance is assessed, ranging from 0 (very poor blocking resistance) to 5 (excellent blocking resistance). When the test charts can be peeled apart using minor force without damaging the surface of the film, blocking is assessed as 3.

Measurement of Film Yellowing:

The yellowing of a coating exposed to daylight or darkness for a specified time period is determined using a Dr Lange Spectropen. The equipment is calibrated to the defined values of the calibration plate and then the b-value is measured according to the CIE L, a, b method. The dark-yellowing is defined as the increase in the yellowness (Δb) of the coating during storage at 52° C., in the dark for 21 days.

Molecular Weight Determination:

Gel permeation chromatography (GPC) analysis for the determination of polymer molecular weights are performed on an Alliance Waters 2695 GPC with three consecutive PL-gel columns (type Mixed-B, 1/d=300/7.5 mm) using tetrahydrofuran (THF, HPLC grade, stabilized with 3,5-di-tert-butyl-4-hydroxytoluene [BHT], preferably with 1.0 vol. % acetic acid) as the eluent at 1 cm$^3$/min and using an Alliance Waters 2410 refractive index detector. A set of polystyrene standards (analysed according to DIN 55672) are used to calibrate the GPC. Samples corresponding to about 16 mg of solid material are dissolved in 8 cm$^3$ of THF. The samples are regularly shaken and dissolved for at least 24 hours for complete "uncoiling" and placed on the autosampling unit of the Alliance Waters 2695. The injection volume is 150 μL and the temperature of the column oven is established at 35° C.

Glass Transition Temperature ($T_G$)

The $T_g$ is measured by DSC using the TA Instruments DSC Q1000 with standard TA Instruments alumina cups of 50 μl. The flow rate is 50 ml/min of nitrogen and the sample is loaded at ambient temperature. The sample is cooled until it reached an equilibrium temperature of −90° C. and then heated at a rate of 10° C./min to 100° C., kept for 5 minutes at 100° C., cooled to −90° C. at a rate of 20° C./min, kept for 5 minutes at −90° C. and subsequently heated at a rate of 10° C./min to 100° C.

The $T_g$ values in the Examples and Tables herein are the midpoint as measured by DSC as described above.

Water Resistance:

A 100 μm thick wet film is cast on a Leneta chart and dried for 24 hours under standard conditions. Then three drops of water are placed on the film and one drop of water is removed after 30 minutes, one after 1 hour and one after 3 hours. The water resistance is assessed immediately after removal of the water and then after 24 hours. The rating for water resistance is from: 0=very poor, dissolved; 3=acceptable; 5=excellent, no damage of the coating.

Gloss Measurement Method:

Gloss measurements are carried out on a BYK Gardner micro-TRI-gloss 20-60-85 gloss meter in accordance with ASTM D523-89.

The examples herein are prepared by the following common method modified as indicated in the tables with reference to each of the alphanumeric labels given below.

Common Method

Step (A1) Preparing an Epoxy Functional Vinyl Polymer (Alternative 1)

In one alternative (A1) of step a round bottom reaction vessel (VOL) equipped with a stirrer, baffle and cooler, is loaded with water (a), Na$_2$SO$_4$ (b) and PAA (c) in a nitrogen atmosphere. The mixture is neutralized with NaOH until the pH is >8 and the mixture temperature is brought to 60° C. A homogeneous mixture of MMA (d), BMA (e), GMA (f), AlBN (g) and CoF (h) is transferred to the reactor and the reaction temperature is brought to 80° C. After time t1 a mixture of FES993 (i) and water (j) is added to the reactor. After time t2 the temperature is raised to 85° C. and is held there for 60 minutes. The reaction vessel is then cooled to ambient temperature and polymer beads are obtained that are washed and dried for use in the next step (B).

The polymer obtainable in this step (A1) is characterised as follows:

$M_n$=k, $M_w$=l, PDi=m, $T_g$=n.

Step (A2) Preparing an Epoxy Functional Vinyl Polymer (Alternative 2)

A round bottom, optionally high pressure where specified herein, reactor (VOL'), equipped with stirrer and cooler, is loaded under nitrogen with a solvent (SOL1, a') and heated to T'1. A homogeneous mixture of styrene (b'), GMA (c'), BA (dd'), BMA (d'), d-BP (e') and t-BPB (f') is fed to the reactor using a pump over time t'1 at pressure (g').

Optionally after the ingredients have been added to the reactor the pump is rinsed with more solvent (SOL1, h'), and the reactor is then heated to T'2 for time t'2, cooled to T'3 and then dtAP (i') is added in small portions over time t'3.

The mixture is held at 140° C. for time t'4 and then the reactor is cooled to ambient temperature. Optionally further solvent is added (SOL1, j')

The polymer obtainable in this step (A2) is characterised as follows: Solid content=k', $M_n$=$M_w$=m', PDi=n'

Step (B) Preparing an Aqueous Autoxidisable Vinyl Polymer

An amount (p) of vinyl polymer prepared as described in the common method step (A1 or A2) above is dissolved in a solvent (SOL2, q). SunFA (r) and TRAP (s) are added to the resulting solution to form a mixture which is heated at 120° C. under nitrogen. The reaction is continued until an acid value (t) is reached.

SOL2 is removed by distillation under reduced pressure and the polymer obtained is characterised as follows:

$M_n$=u, $M_w$=v, PDi=w, $T_g$=x.

Step (C) Dispersing Vinyl Polymer Obtainable from Step (B)

To an amount (y) of a polymer prepared as described in the common method step (B) is added Atlas G5000 (z), ALES (aa) and Ingredient) (IGD1, ab). Then water (ac) is added slowly to form a dispersion which is stirred for 30 minutes before being stored under nitrogen. The dispersion is characterised as follows:
solids content=ad, pH=pH2, ND×AV=ae All the examples were prepared as described in the common methods with reference to the data in the Tables (as shown below). In the Tables NM indicates a parameter is not measured and NA that that parameter is not applicable to that example.

The properties of coatings made from the examples and pigment pastes PP1 prepared by mixing the ingredients as indicated in Table 7 are also tested and the results given in Table 8 below.

TABLE 1

Common method Step A - Alternative 1 - Process conditions

| | Item | | | | | | | | | | | | |
|---|---|---|---|---|---|---|---|---|---|---|---|---|---|
| | Vessel size | Water | $Na_2SO_4$ | PAA | MMA | BMA | GMA | AIBN | CoF | Rtn. time | FES993 | water | Add. time |
| | Units | | | | | | | | | | | | |
| | liters | grams | grams | grams | grams | grams | grams | grams | grams | mins | grams | grams | mins |
| | Label | | | | | | | | | | | | |
| Ex | VOL | a | b | c | d | e | f | g | h | t1 | I | j | t2 |
| C1a | 2 | 867.8 | 1.59 | 0.79 | 381.59 | 0 | 254.39 | 4.77 | 0.01 | 45 | 0.53 | 79.50 | 15 |
| C2a | 2 | 867.8 | 1.59 | 0.79 | 190.79 | 159.00 | 286.19 | 4.77 | 0.006 | 60 | 0.53 | 79.50 | 15 |
| Ex1a | 2 | 867.8 | 1.59 | 0.79 | 190.79 | 127.19 | 317.99 | 4.77 | 0.064 | 90 | 0.53 | 79.50 | 10 |
| Ex2a | 10 | 4911.75 | 9.00 | 4.47 | 1076.36 | 719.90 | 1799.82 | 27.00 | 0.36 | 105 | 3.00 | 449.97 | 10 |
| Ex3a | 10 | 4932.00 | 8.94 | 4.44 | 1073.21 | 715.48 | 1788.69 | 26.83 | 0.36 | 90 | 2.98 | 447.19 | 10 |

TABLE 2

Common method Step A - Alternative 1 - Characterization of product

| | Item | | | |
|---|---|---|---|---|
| | $M_n$ | $M_w$ | PDi | $T_g$ |
| | Units | | | |
| | g/mol | g/mol | none | ° C. |
| | Label | | | |
| Ex | k | l | m | n |
| C1a | 4991 | 22107 | 4.43 | 97 |
| C2a | 19048 | 39989 | 2.1 | 71 |
| Ex1a | 1736 | 3589 | 2.07 | 24 |
| Ex2a | 2221 | 4943 | 2.23 | 37 |
| Ex3a | 2081 | 4256 | 2.04 | 34 |

Common Method Step A—Alternative 2—Process Conditions

TABLE 3a

| | Item | | | | | | | | | | | |
|---|---|---|---|---|---|---|---|---|---|---|---|---|
| | High pressure vessel | Solvent name | Solvent amount | Mix temp | Stryene | GMA | BA | BMA | dtBP | tBPB | Reactor feed time | Pressure |
| | Units | | | | | | | | | | | |
| | none | None | grams | ° C. | grams | Grams | grams | grams | grams | grams | hours | bar |
| | Label | | | | | | | | | | | |
| Ex | none | SOL1 | a' | T'1 | b' | c' | dd' | d' | e' | f' | t'1 | g' |
| C3a | NO | Xylene | 219.99 | 140 | 319.59 | 213.06 | 0 | 0 | 27.33 | 20.03 | 4 | 1 |
| Ex4a | YES | Toluene | 500.0 | 150 | 0 | 475.3 | 475.3 | 0 | 38.0 | 0 | 2.5 | 2.8 |

TABLE 3b

| | More Solvent | Reactor heat temp | Further reaction time | Reactor cool temp | dtAP | dtAP time | Hold time | Further Solvent |
|---|---|---|---|---|---|---|---|---|
| Units | Grams | °C. | mins | °C. | grams | hours | mins | grams |
| Label Ex | h' | T'2 | t'2 | T'3 | i' | t3 | t'4 | j' |
| C3a | 0 | NA | 0 | NA | 0 | 0 | 120 | 0 |
| Ex4a | 20.0 | 150 | 30 | 140 | 38.0 | 2 | 90 | 101.04 |

TABLE 4

Common method Step A - Alternative 2 - Characterization of product

| | Solids | $M_n$ | $M_w$ | PDi |
|---|---|---|---|---|
| Units | % | g/mol | g/mol | none |
| Label Ex | k' | l' | m' | n' |
| C3a | NM | 3123 | 7497 | 2.4 |
| Ex4a | 60.0 | 2548 | 7720 | 3.0 |

TABLE 5

Common method Step B

| | Polymer from A | Solvent name | Solvent amount | SunFA | TRAP | AN | $M_n$ | $M_w$ | PDi | $T_g$ |
|---|---|---|---|---|---|---|---|---|---|---|
| Units | grams | none | grams | grams | grams | mg KOH/g | g/mol | g/mol | none | °C. |
| Label Ex | p | SOL2 | q | r | s | t | u | v | w | x |
| C1b | 500.0 | Toluene | 300.34 | 397.06 | 3.97 | 5.9 | 5856 | 43337 | 7.4 | 26 |
| C2b | 500.0 | Toluene | 344.45 | 531.33 | 5.31 | 14.0 | 44460 | 233091 | 5.24 | 4 |
| C3b | 678.0 | Xylene | 0 | 450.0 | 4.5 | 13.6 | 3383 | 13533 | 4.0 | −14 |
| Ex1b | 500.0 | Toluene | 332.59 | 492.85 | 4.93 | 5.7 | 2736 | 7662 | 2.8 | −12 |
| Ex2b | 550.0 | Toluene | 365.85 | 542.13 | 5.42 | 10.2 | 2531 | 11052 | 4.4 | −13 |
| Ex3b | 1000.0 | Toluene | 665.18 | 985.70 | 9.86 | 8.9 | 3601 | 9044 | 2.51 | −16 |
| Ex4b | 583.3 | Toluene | 0 | 342.0 | 3.42 | 4.3 | 2331.95 | 19122 | 8.2 | −44 |

When q is 0 this means solvent is present from the previous step (which is removed as described) but no more solvent added in this step

TABLE 6

Common method Step C

| | Polymer from B | Atlas G5000 | FES77 | Ingredient Name | Ingredient Amount | water | solids | pH |
|---|---|---|---|---|---|---|---|---|
| Units | grams | grams | grams | None | grams | grams | % | none |
| Label Ex | y | z | aa | IGD1 | ab | ac | ad | pH2 |
| C1c | 97.0 | 2.43 | 11.76 | None | 0 | 76.6 | 55 | 5.4 |
| C2c | 100.8 | 2.52 | 12.22 | Dow PnP | 10.08 | 98.03 | 52.4 | 6.3 |

TABLE 6-continued

Common method Step C

| | | | | Item | | | | |
|---|---|---|---|---|---|---|---|---|
| | Polymer from B | Atlas G5000 | FES77 | Ingredient Name Units | Ingredient Amount | water | solids | pH |
| | grams | grams | grams | None Label | grams | grams | % | none |
| Ex | y | z | aa | IGD1 | ab | ac | ad | pH2 |
| C3c | 112.0 | 2.8 | 13.58 | None | 0 | 88.5 | 45 | 5.0 |
| Ex1c | 117.0 | 2.93 | 14.18 | DowPnP | 23.90 | 118.89 | 45 | 6.0 |
| Ex2c | 100.0 | 2.50 | 12.12 | Sefose | 20.00 | 95.38 | 55 | 5.9 |
| Ex3c | 500.0 | 12.50 | 60.61 | None | 0 | 395.08 | 55.6 | 6.6 |
| Ex4c | 100.07 | 2.50 | 12.13 | None | 0 | 79.07 | 55.0 | 5.5 |

TABLE 7

Composition pigment paste PP1

| Compound | Pigment paste PP1 |
|---|---|
| Water | 4.8 |
| Dehydran 1293 | 0.4 |
| Disperbyk 190 | 0.7 |
| Kronos 2190 | 24.1 |

TABLE 8

Application properties of water-based binders

| | | | | | Ex | | | | |
|---|---|---|---|---|---|---|---|---|---|
| | C1 | C2 | C3 | Ex 1 | Ex 1 pigment | Ex 2 | Ex 2 pigment | Ex 3 | Ex 4 |
| Binder (wt %) | 100 | 100 | 100 | 100 | 70 | 100 | 70 | 100 | 100 |
| Particle size [nm] | 985 | 555 | 370 | 265 | n.a. | 320 | n.a. | 380 | 354 |
| Additol VXW4940/water 1:1 | 2.2 | 2.2 | 1.8 | 1.8 | 1.4 | 2.2 | 1.4 | 2.2 | 2.2 |
| PP1 (wt %) | — | — | — | — | 30 | — | 30 | — | — |
| DFT [hr] | 1 | 0.25 | 1.5 | 1 | 1 | 2 | 1 | 2 | |
| TFT [hr] | 2 | 0.75 | 7 | 3 | | 2 | 3.5 | 2 | 3.5 |
| G(s) | 81.6 | 73.5 | 70.1 | 78.2 | 76.6 | 73.8 | 79.7 | 82.4 | 78.4 |
| G(r) | 40.0 | 19.1 | 59.3 | 77.6 | 72.7 | 72.6 | 77.3 | 78.3 | 72 |
| Telg. | 41.6 | 54.4 | 10.8 | 0.6 | 3.9 | 1.2 | 2.4 | 4.1 | 6.4 |
| G decay (4 d) | 1.9 | 3.4 | 10.1 | 4.2 | 2.4 | 0.8 | 0.2 | 2.1 | 9.8 |
| G decay (7 d) | 1 | 3.6 | 13.5 | 4.6 | 4.4 | 5.7 | 3.9 | 4.3 | 13.9 |
| G decay (14 d) | 4.6 | 4.2 | 26.3 | 9.3 | 4.7 | 9.4 | 8.0 | 9.2 | 28.3 |
| Initial yellowness [Δb] | 3.8 | 3.1 | 4.5 | 4.7 | 1.0 | 3.4 | 2.2 | 3.8 | 3.7 |
| Dark yellowing Δb 3 wks 52° C. | 6.6 | 14.6 | 21.4 | 6.1 | | 5.7 | | | 9.2 |
| Water resistance | | | | | | | | | |
| 30 min after recovery | n.d. | n.d. | n.d. | 5/5 | 4/5 | n.d. | 4/5 | n.d. | n.d. |
| 1 hr after recovery | n.d. | n.d. | n.d. | 4.5/5 | 3/5 | n.d. | 3/5 | n.d. | n.d. |
| 3 hrs after recovery | n.d. | n.d. | n.d. | 4/5 | 1/5 | n.d. | 2/5 | n.d. | n.d. |
| Blocking | | | | | | | | | |
| 4 hrs at amb. temp. | n.d. | n.d. | n.d. | | 4.5 | | 4 | n.d. | n.d. |
| 2 hrs at 50° C. | n.d. | n.d.. | n.d.. | n.d. | 4 | n.d. | 3 | n.d.. | n.d.. |

Key for Table 6
'DFT' denotes dust free time defined and measured as described herein
'TFT' denotes tack free time defined and measured as described herein
'G(r)' denotes the initial rough gloss value as defined herein (measured in gloss units 1 day after film formation)
'G(s)' denotes the initial smooth gloss value as defined herein (measured in gloss units 1 day after film formation)
'Telg.' denotes the telegraphing value as defined herein in gloss units (i.e. G(s)_ G(r))
'G decay ('n' d)' denotes the gloss decay value as defined herein after 'n' days (i.e. G(r) minus the rough gloss measured 'n' days after film formation).

The invention claimed is:

1. An aqueous emulsion, coating composition that comprises an autoxidisable vinyl oligomer, wherein:

I) said autoxidisable vinyl oligomer has:
   i) fatty acid residue in an amount greater than or equal to 20% by weight of the autoxidisable vinyl oligomer;
   ii) a glass transition temperature (Tg) from −50° C. to +15° C.;
   iii) an acid value less than 40 mg KOH/g;

iv) a weight average molecular weight (Mw) from 2,500 to 40,000 g/mol; and
v) a polydispersity (PDi) from 2 to 12; and wherein
II) said composition has:
   a) a co solvent content less than 25% by weight of solids;
   b) a N methylpyrrolidone content less than 13% by weight of solids;
   c) a solids content greater than or equal to 38% by the total weight of said composition;
   d) 38% to 65% of the autoxidisable vinyl oligomer;
   e) 0 to 20% of co-solvent; and
   f) 15% to 58% of water, wherein
   the percentages of d), e) and f) are by weight of the composition and d)+e)+f)=100%, and wherein
III) said composition when in the form of a film has a telegraphing value of less than 10 gloss units, wherein the telegraphing value is a difference between an initial smooth gloss value of the film minus an initial rough gloss value of the film, where
   (1) the initial smooth gloss value is the gloss when the film is cast on a smooth PVC substrate with Rz=1 µm±0.25 µm and the initial rough gloss value is the gloss when the film is cast on a rough PVC substrate with Rz=25 µm±5 µm, wherein Rz is an average of five greatest peak-to-valley separations in a scanned surface area of 1.9×2.5 mm of the PVC substrate as analyzed with an optical profilometer at a magnification of 2.5;
   (2) each film has a dry film thickness of 52 µm±6 µm; and
   (3) each initial gloss value is measured at a 20° angle, 24 hours after the film has been cast onto the PVC substrate.

2. The aqueous autoxidisable coating composition according to claim 1, wherein the composition comprises an autoxidisable vinyl oligomer obtained by a process comprising steps of:
   I) polymerising ethylenically unsaturated vinyl monomers comprising:
      i) 30% to 70% of at least one monomer G selected from hydroxylalkyl(meth)acrylates and epoxy functional vinyl monomers;
      ii) 30% to 70% of at least one other ethylenically unsaturated vinyl monomer; and
      iii) <1% of chlorine containing monomers;
      where the percentages are by weight of total monomers;
   II) reacting the oligomer obtained in step I) with fatty acids having an average iodine value in the range of 80 to 180 g I2/100 g fatty acid;
   where the autoxidisable vinyl oligomer has
      i) oligomeric backbone in an amount from 35% to 62% by weight of the oligomer;
      ii) fatty acid residue in an amount from 38% to 65% by weight of the oligomer;
      iii) a Tg from −50 to 15° C.;
      iv) a Mw from 6500 to 25000 g/mol; and
      v) a PDi from 2 to 8;
   said composition having
      a) a co solvent content <15 wt % by weight of solids;
      b) a N methylpyrrolidone content <13 wt % by weight of solids;
      c) heterocyclic amine containing solvent content of 0 wt % by weight of solids;
      d) a solids content >38 wt %;
      e) a pH in the range of from 4.1 to 8.4; and wherein
   said composition when in the form of a coating has a telegraphing value of less than 10 gloss units.

3. The aqueous autoxidisable coating composition according to claim 1, wherein 0% of glycidyl esters of unsaturated fatty acids are used in the preparation of the autoxidisable vinyl oligomer.

4. The aqueous autoxidisable coating composition according claim 1, wherein the autoxidisable vinyl oligomer, if carboxylic acid functional conforms to the following relationship:

$$ND \times AV \leq 22$$

where ND=neutralization degree of the acid groups on the oligomer and AV=acid value.

5. The aqueous autoxidisable coating composition according to claim 1, wherein the composition comprises <5% of N methylpyrrolidone by weight of solids.

6. The aqueous autoxidisable coating composition according to claim 1, wherein the composition comprises <13% by weight of solids, of nitrogen-containing molecules with an evaporation rate <0.1 as determined by ASTM D3539 relative to the evaporation rate of n-butyl acetate=1.00 which are either aromatic, heterocyclic or which are aromatic and aliphatic primary and secondary (di)amines with the proviso that the amount of nitrogen in such molecules is >5% by weight of the molecule.

7. The aqueous autoxidisable coating composition according to claim 1, wherein said composition comprises:
   i) 20% to 45% of $TiO_2$;
   ii) 20% to 45% of the autoxidisable vinyl oligomer;
   iii) 0 to 10% of co solvent;
   iv) 0.1% to 3% of thickener;
   v) 0 to 5% of dispersing agent; and
   vi) 25% to 60% water;
   where the percentages are by weight of the composition and i)+ii)+iii)+iv)+v)=100%.

8. A method of coating a substrate comprising the steps of:
   i) applying a coating composition as claimed in claim 1 to a substrate; and
   ii) drying the substrate to form a coating thereon; wherein the coating has a telegraphing value of less than 10 gloss units.

* * * * *